(12) United States Patent
Mechi

(10) Patent No.: US 8,441,823 B2
(45) Date of Patent: May 14, 2013

(54) RECTIFIER CIRCUIT

(75) Inventor: Abdallah Mechi, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 331 days.

(21) Appl. No.: 12/921,535

(22) PCT Filed: Feb. 27, 2009

(86) PCT No.: PCT/JP2009/053696
§ 371 (c)(1),
(2), (4) Date: Sep. 8, 2010

(87) PCT Pub. No.: WO2009/113410
PCT Pub. Date: Sep. 17, 2009

(65) Prior Publication Data
US 2011/0013440 A1 Jan. 20, 2011

(30) Foreign Application Priority Data
Mar. 14, 2008 (JP) .................................. 2008-065822

(51) Int. Cl.
*H02M 7/217* (2006.01)
(52) U.S. Cl.
USPC .......................................... 363/127; 363/70
(58) Field of Classification Search ............ 363/52, 363/53, 65, 67, 69, 70, 81, 84, 87–89, 125–127
See application file for complete search history.

(56) References Cited

U.S. PATENT DOCUMENTS

| 5,319,536 | A | | 6/1994 | Malik | |
|---|---|---|---|---|---|
| 5,460,244 | A | | 10/1995 | Tanahashi | |
| 5,831,846 | A | * | 11/1998 | Jiang | 363/125 |
| 6,307,761 | B1 | * | 10/2001 | Nakagawa | 363/65 |
| 7,489,116 | B2 | * | 2/2009 | Lanni | 323/222 |
| 2009/0034305 | A1 | | 2/2009 | Mechi | |
| 2009/0067206 | A1 | | 3/2009 | Oguchi et al. | |
| 2011/0051468 | A1 | * | 3/2011 | Kyono | 363/21.02 |

FOREIGN PATENT DOCUMENTS

| JP | 9-331678 A | 12/1997 |
|---|---|---|
| JP | 10-174443 A | 6/1998 |
| JP | 11-18433 A | 1/1999 |
| JP | 2007-174858 A | 7/2007 |
| JP | 2007-185019 A | 7/2007 |

* cited by examiner

*Primary Examiner* — Matthew Nguyen
(74) *Attorney, Agent, or Firm* — Birch, Stewart, Kolasch & Birch, LLP

(57) ABSTRACT

Switches perform switching at a timing when a first phase voltage and a second phase voltage outputted from a three-phase voltage source have a phase difference of 90°. Then, a three-phase/two-phase conversion inductor outputs a pair of AC currents, and a rectification and a single-phase pulse-width modulation are performed on each of AC currents. Modulated currents obtained as a result of the rectification and the single-phase pulse-width modulation are synthesized, to generate an output current, which is supplied to a circuit in which a capacitor and a load are connected in parallel with each other.

6 Claims, 15 Drawing Sheets

F I G. 4
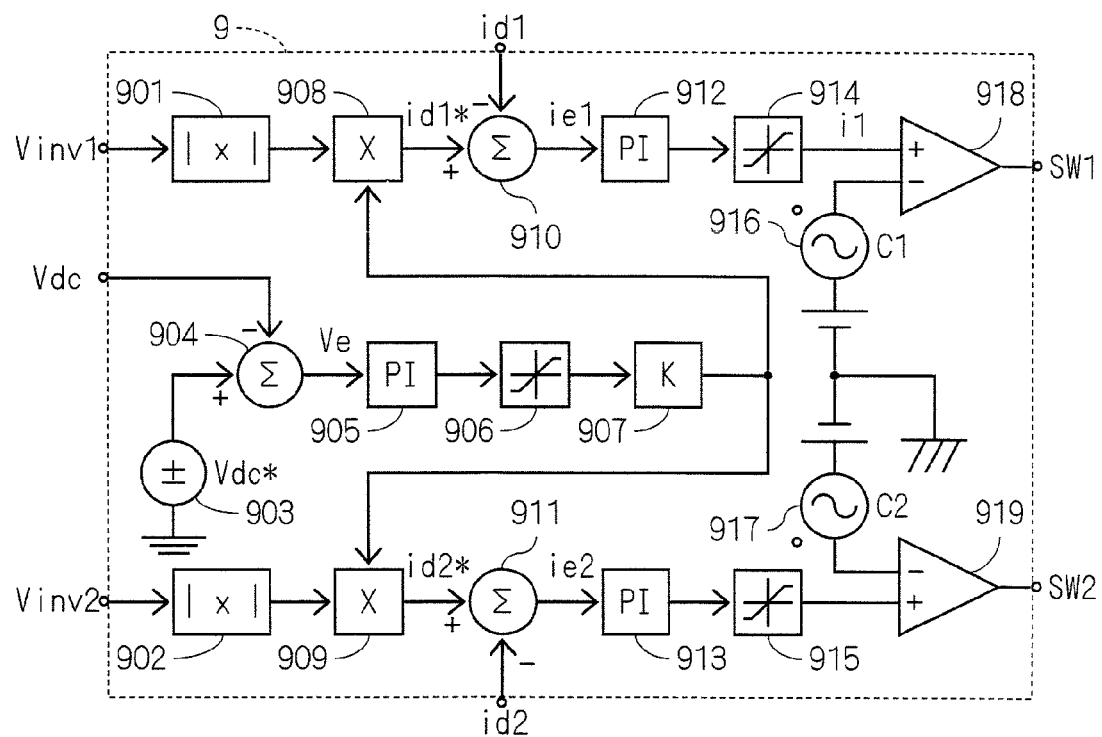

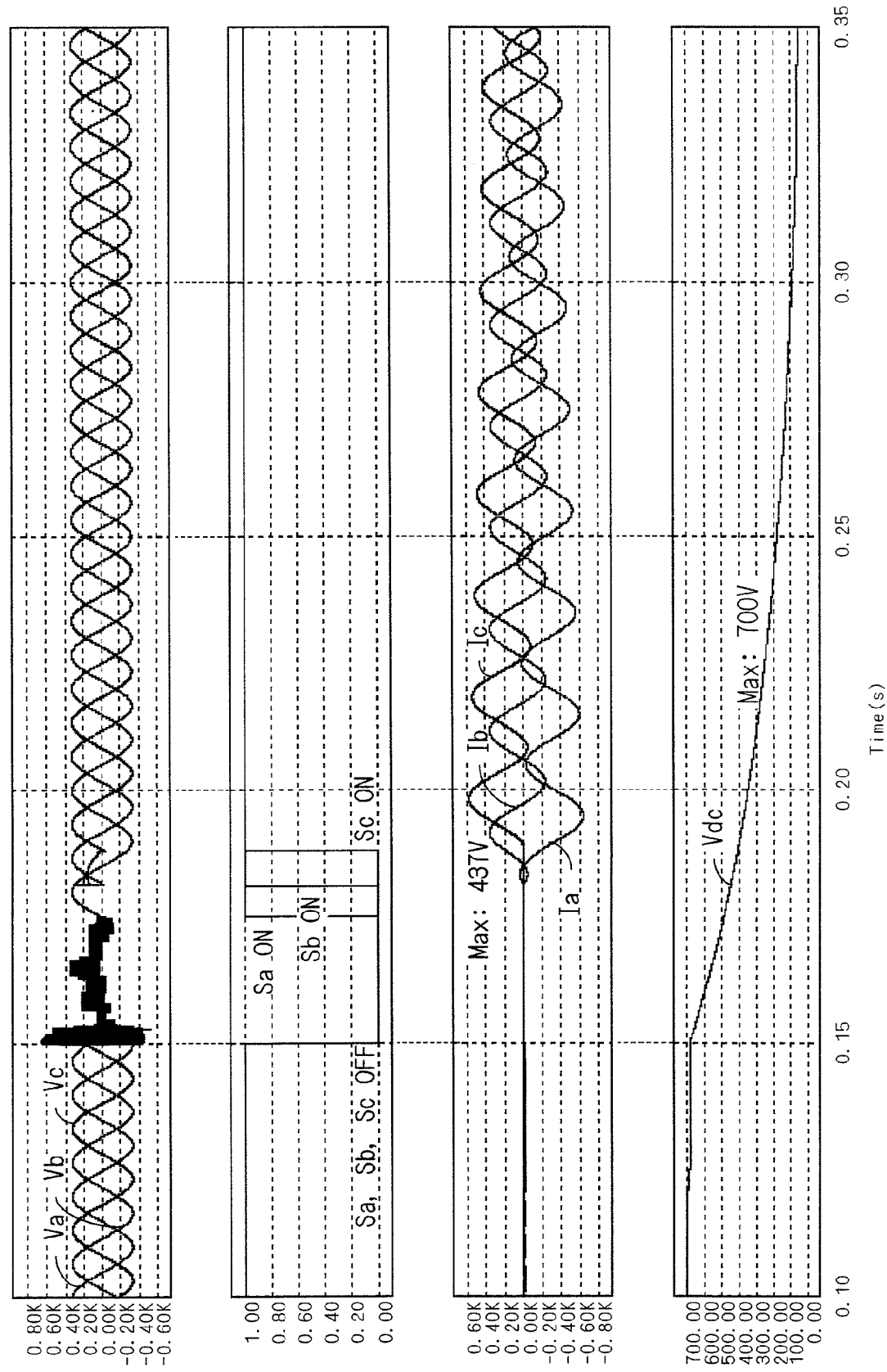

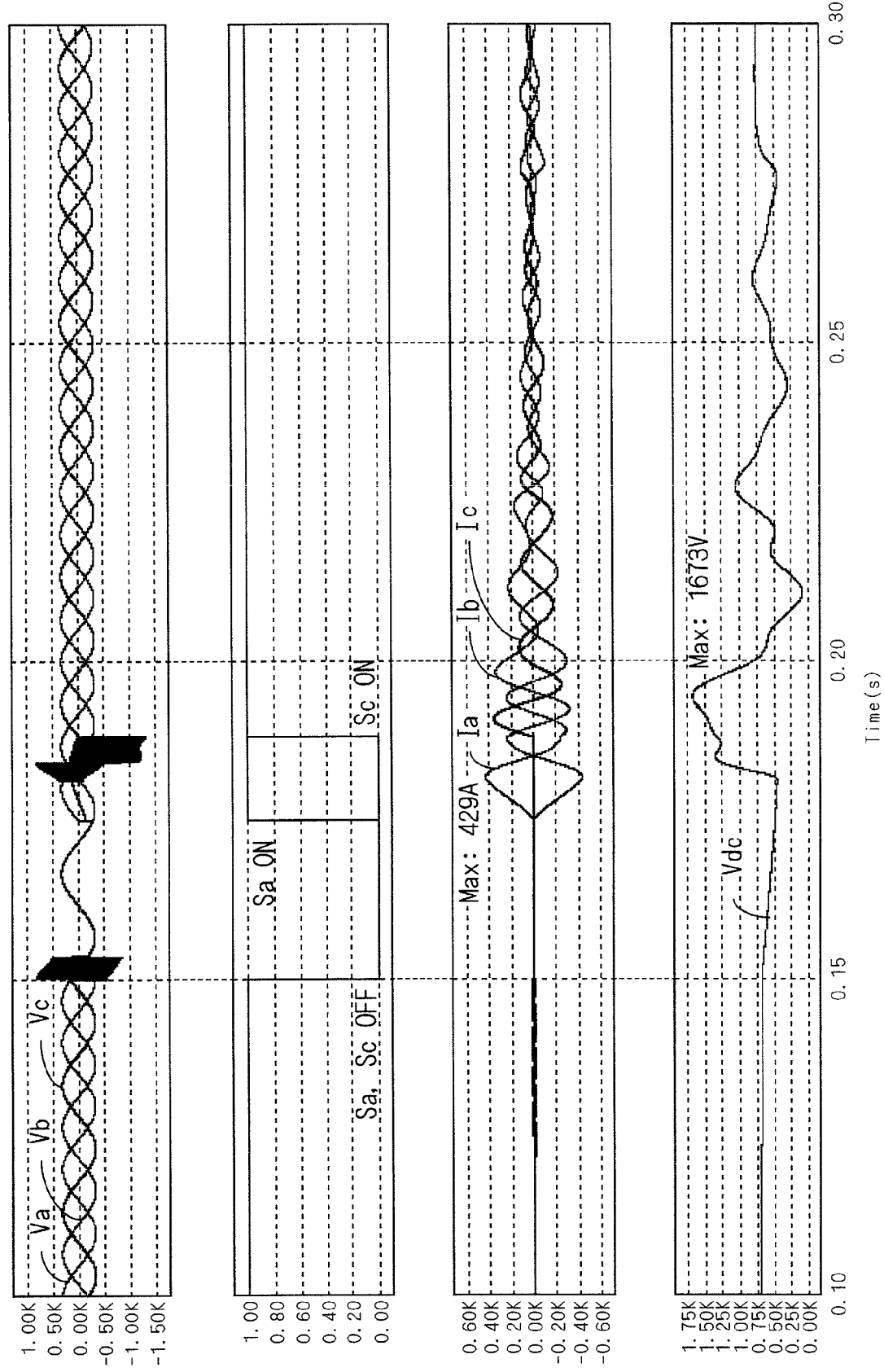

US 8,441,823 B2

RECTIFIER CIRCUIT

TECHNICAL FIELD

The present invention relates to a rectifier circuit, and particularly to a technique for rectifying three-phase currents.

BACKGROUND ART

FIG. 11 is a circuit diagram illustrating a conventional three-phase PWM converter. When a three-phase voltage source 12 applies three-phase voltages Va, Vb, Vc to a converter CNV, three-phase currents Ia, Ib, Ic flow to the converter CNV via a group of reactors Z. FIG. 12 is a diagram showing input/output waveforms obtained as a result of simulation in a steady state of the three-phase PWM converter. To set a voltage Vdc at 700 V, the three-phase currents Ia, Ib, Ic flow with a peak value of 12 A.

As a technique pertinent to the present invention, a technique using a PWM (Pulse Width Modulation) power converting apparatus for converting three-phase electric power into two-phase electric power is illustrated in Japanese Patent Application Laid-Open No. 11-018433 and the like.

DISCLOSURE OF THE INVENTION

Problems to be Solved by the Invention

In such a converter, a high current may occur at a time of a start-up and at a time of a recovery from an instantaneous stop and the like, as described below.

FIG. 13 is a diagram showing input/output waveforms obtained as a result of simulation at a time of an instantaneous-stop/recovery in the conventional three-phase PWM converter. Here, the term "recovery" indicates that a voltage is applied from a three-phase voltage source 12 immediately after an instantaneous stop occurs in a normal operation state and before the voltage Vdc becomes 0V. In this simulation, a virtual instantaneous-stop/recovery was simulated by performing simultaneous interrupt/conduction of switches Sa, Sb, Sc provided between the three-phase voltage source 12 and the group of reactors Z. This is equivalent to a case where all of the three phases are instantaneously failed. The second uppermost graph shows a control signal for the switches Sa, Sb, Sc, and indicates that at a time of 0.15 s, the switches Sa, Sb, Sc were shifted from a conduction state to a non-conduction state, and at a time of 0.175 s, the switches Sa, Sb, Sc were shifted from the non-conduction state to the conduction state. The graph indicates that after the recovery, the currents Ia, Ib, Ic were transiently and largely disturbed and the voltage Vdc transiently rose up to nearly four times of the steady-state voltage.

FIG. 14 is also a diagram showing input/output waveforms obtained as a result of simulation at a time of an instantaneous-stop/recovery in the conventional three-phase PWM converter. A virtual instantaneous-stop/recovery was simulated by performing simultaneous interrupt/conduction of switches Sa, Sc while keeping the switch Sb conducting. This is equivalent to a case where two phases corresponding to the voltages Va, Vc are instantaneously failed. The second uppermost graph shows a control signal for the switches Sa, Sc, and indicates that at a time of 0.15 s, the switches Sa, Sc were shifted from the conduction state to the non-conduction state, and at a time of 0.175 s, the switches Sa, Sc were shifted from the non-conduction state to the conduction state. In this case, similarly to the graph shown in FIG. 8, it is indicated that the currents Ia, Ib, Ic and the voltage Vdc were largely disturbed after the recovery.

Here, in order to improve the transient disturbance occurring after the recovery, it is conceivable to make a device in a timing of rendering the switches Sa, Sb, Sc conducting relative to the three-phase voltage source 12 which is not failed. Specifically, each of the switches Sa, Sb, Sc starts conducting at a zero-crossing time point of each corresponding one of the voltages Va, Vb, Vc.

FIG. 15 is a diagram showing input/output waveforms obtained as a result of simulation in which the switches Sa, Sb, Sc started conducting at zero-crossing time points at which the voltages Va, Vb, Vc were shifted from negative to positive, and then recovered. FIG. 16 is a diagram showing input/output waveforms obtained as a result of simulation in which the switches Sa, Sc started conducting while the switch Sb was kept conducting, and then recovered. In each of the cases, the currents Ia, Ib, Ic and the voltage Vdc were largely disturbed similarly to in FIGS. 13 and 14, though waveforms thereof are different from those shown in FIGS. 13 and 14. In the case shown in FIG. 15, due to the disturbance of the currents Ia, Ib, Ic, the voltage Vdc could no be maintained, and approached asymptotically to 0V.

In this manner, if the conventional converter CNV is employed, the device of performing a switching at a zero crossing is ineffective.

To produce a converter capable of withstanding such a high current, it is necessary to arrange an expensive circuit element. Therefore, it is difficult to downsize the converter and to reduce costs. In addition, there is a problem that a control of the converter is difficult because of an occurrence of this high current.

The present invention has been accomplished in view of the above problems, and an object of the present invention is to provide a technique for realizing a downsizing and a cost reduction by suppressing a high current at a time of a start-up/recovery.

Means for Solving the Problems

In order to solve the above-mentioned problem, a first invention is a rectifier circuit (10) including: a first switch (S1) having one end (S11) to which a first phase voltage outputted from a three-phase voltage source (12) is applied, and the other end (S12) whose conduction/non-conduction with the one end is controlled; a second switch (S2) having one end (S21) to which a second phase voltage outputted from the three-phase voltage source is applied, and the other end (S22) whose conduction/non-conduction with the one end is controlled; a three-phase/two-phase conversion inductor (14) that inputs thereto the first phase voltage and a third phase voltage outputted from the three-phase voltage source, and outputs a fourth phase voltage (Vinv1) and a fifth phase voltage (Vinv2), the fourth phase voltage (Vinv1) being the first phase voltage based on the third phase voltage, the fifth phase voltage (Vinv2) being based on the second phase voltage and cooperating with the fourth phase voltage to form two-phase voltages; a first single-phase pulse-width modulation converter (16) that performs a first pulse-width modulation on a first rectified current (id1) obtained by rectifying the fourth phase voltage, and outputs a first modulated current (m12); and a second single-phase pulse-width modulation converter (18) that performs a second pulse-width modulation on a second rectified current (id2) obtained by rectifying the fifth phase voltage, and outputs a second modulated current (m34).

A second invention is the first invention, and the first switch (S1) is shifted from a non-conduction state to a conduction state, when a voltage obtained by subtracting the third phase voltage from the first phase voltage is substantially zero, and the second switch (S2) is shifted from a non-conduction state to a conduction state, nearly when the voltage has an extreme value.

A third invention is the first invention, and the first switch (S1) is shifted from a non-conduction state to a conduction state, while the second switch (S2) is not conducting, and the second switch is shifted from a non-conduction state to a conduction state, while the first switch is conducting.

A fourth invention is any one of the first to third inventions, and the rectifier circuit (10) further includes a capacitor (20) connected in parallel with each of an output side of the first single-phase pulse-width modulation converter (16) and an output side of the second single-phase pulse-width modulation converter (18).

A fifth invention is the fourth invention, and the first single-phase pulse-width modulation converter (16) includes a first single-phase diode bridge (22) and a first chopper (24), and the first single-phase diode bridge (22) performs a full-wave rectification on the fourth phase voltage, and outputs the first rectified current (id1), and the first chopper (24) performs a first chopper operation on the first rectified current, and outputs the first modulated current (m12), and the second single-phase pulse-width modulation converter (18) includes a second single-phase diode bridge (32) and a second chopper (34), and the second single-phase diode bridge (32) performs a full-wave rectification on the fifth phase voltage, and outputs the second rectified current (id2), and the second chopper (34) performs a second chopper operation on the second rectified current, and outputs the second modulated current (m34).

A sixth invention is the fifth invention, and the first single-phase diode bridge (22) includes a high-potential side output end (+) that outputs the first rectified current (id1), and a low-potential side output end (−), and the first chopper (24) includes a first inductor (42), a first diode (46), a second diode (48), and a first switching element (44), and the first inductor (42) is connected to the high-potential side output end of the first single-phase diode bridge, and the first diode (46) has an anode connected to the first single-phase diode bridge via the first inductor, and a cathode that outputs the first modulated current (m12), and the second diode (48) has an anode and a cathode connected to the low-potential side output end of the first single-phase diode bridge, and the first switching element (44) has a first end connected to the anode of the first diode and a second end connected to the cathode of the second diode, and the first switching element (48) is opened and closed between the first end and the second end, and the second single-phase diode bridge (32) includes a high-potential side output end (+) that outputs the second rectified current (id2), and a low-potential side output end (−), and the second chopper (34) includes a second inductor (52), a third diode (56), a fourth diode (58), and a second switching element (54), and the second inductor (52) is connected to the high-potential side output end of the second single-phase diode bridge, and the third diode (56) has an anode connected to the second single-phase diode bridge via the second inductor, and a cathode that outputs the second modulated current (m34), and the fourth diode (58) has an anode and a cathode connected to the low-potential side output end of the second single-phase diode bridge, and the second switching element (54) has a third end connected to the anode of the third diode and a fourth end connected to the cathode of the fourth diode, and the second switching element (54) is opened and closed between the third end and the fourth end, and the cathode of the first diode and the cathode of the third diode are commonly connected to one end of the capacitor, and the anode of the second diode and the anode of the fourth diode are commonly connected to the other end of the capacitor.

EFFECTS OF THE INVENTION

According to the first invention, since the first modulated current and the second modulated current have a phase difference of approximately 90°, a high current at a time of a start-up/recovery can be suppressed, to realize a downsizing and a cost reduction.

According to the second invention, the first switch is shifted from the non-conduction state to the conduction state, at a point near a zero-crossing of the fourth phase voltage (Vinv1), and the second switch is shifted from the non-conduction state to the conduction state, at a point near a zero-crossing of the fifth phase voltage (Vinv2). Therefore, a high current at a time of a start-up/recovery can be suppressed, to realize a downsizing and a cost reduction.

According to the third invention, a phase difference between the fourth phase voltage (Vinv1) and the fifth phase voltage (Vinv2) can be aligned with a phase difference of a current inputted to the first single-phase pulse-width modulation converter and a current inputted to the second single-phase pulse-width modulation converter, which makes a control easy.

According to the fourth invention, a smoothed voltage can be supplied to a load connected in parallel with the capacitor.

The fifth invention contributes to a realization of the first single-phase pulse-width modulation converter and the second single-phase pulse-width modulation converter.

According to the sixth invention, a step-up chopper can be performed as the first chopper operation and the second chopper operation, and a DC voltage higher than peak values of AC voltages flowing in the first single-phase diode bridge and the second single-phase diode bridge can be applied to the capacitor.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a circuit diagram illustrating a configuration of a switching signal generation circuit which generates a switching signal;

FIG. 15 is a diagram showing input/output waveforms obtained as a result of simulation in which each switch started conducting at a zero-crossing time point at which a voltage is shifted from negative to positive, and then recovered; and FIG. 16 is a diagram showing input/output waveforms obtained as a result of simulation at a time of a restart in which while one switch was kept conducting, the other switches started conducting and then recovered.

BEST MODE FOR CARRYING OUT THE INVENTION

Figure 1:
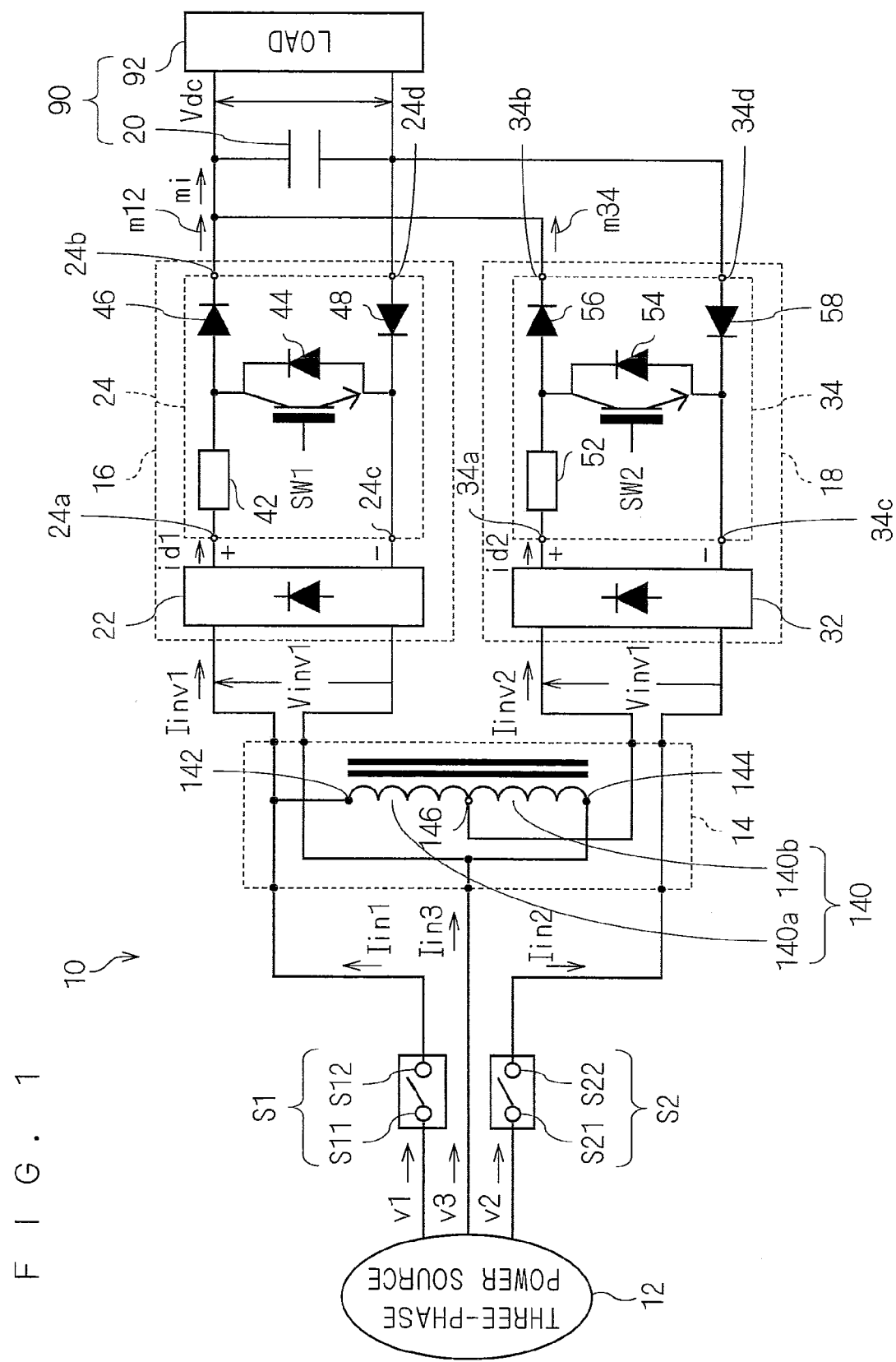
FIG. 1 is a circuit diagram illustrating a configuration of a DC power supply system according to a first embodiment of the present invention.

In the following, preferred embodiments of the present invention will be described with reference to the drawings. In the drawings starting from FIG. 1 which will be referred to below, only elements pertinent to the present invention are shown.

First Embodiment

Circuit Configuration

FIG. 1 is a circuit diagram illustrating a configuration of a DC power supply system according to a first embodiment of the present invention. This DC power supply system includes a three-phase voltage source 12 and a rectifier circuit 10 which rectifies three-phase AC voltages. In the rectifier circuit 10, a three-phase/two-phase conversion inductor 14 converts three-phase electric power supplied from the three-phase voltage source 12 into two-phase electric power. Furthermore, a first single-phase pulse-width modulation converter 16 and a second single-phase pulse-width modulation converter 18 perform a pulse-width modulation to operate a load 92.

As the three-phase voltage source 12, for example, a brushless DC motor or an induction motor is adopted. The three-phase voltage source 12 outputs a first phase voltage v1, a second phase voltage v2, and a third phase voltage v3. As a moving force of the three-phase voltage source 12, for example, not only a turbine or an engine but also natural power such as wind power and hydraulic power may be adopted.

Switches S1, S2 are provided for the first phase voltage v1 and the second phase voltage v2 among the three phase voltages v1, v2, v3 outputted from the three-phase voltage source 12. Specifically, the switch S1 has two contacts S11, S12. The first phase voltage v1 is applied to the contact S11, and conduction/non-conduction of the switch S1 is controlled by open and close between the contact S11 and the contact S12. The switch S2 also has two contacts S21, S22. The second phase voltage v2 is applied to the contact S21, and conduction/non-conduction of the switch S2 is controlled by open and close between the contact S21 and the contact S22.

The switches S1, S2 are connected to a zero-crossing circuit 60 (see FIG. 2) for example. The switch S1 is shifted from a non-conduction state to a conduction state, when a voltage difference between the first phase voltage v1 and the third phase voltage v3 is approximately 0V. The switch S2 is shifted from a non-conduction state to a conduction state, nearly when this voltage difference has an extreme value. Here, the switch S1 is shifted from the non-conduction state to the conduction state, when the switch S2 is in the non-conduction state. The switch S2 is shifted from the non-conduction state to the conduction state, when the switch S1 is in the conduction state.

<Zero-Crossing Circuit>

Figure 2:
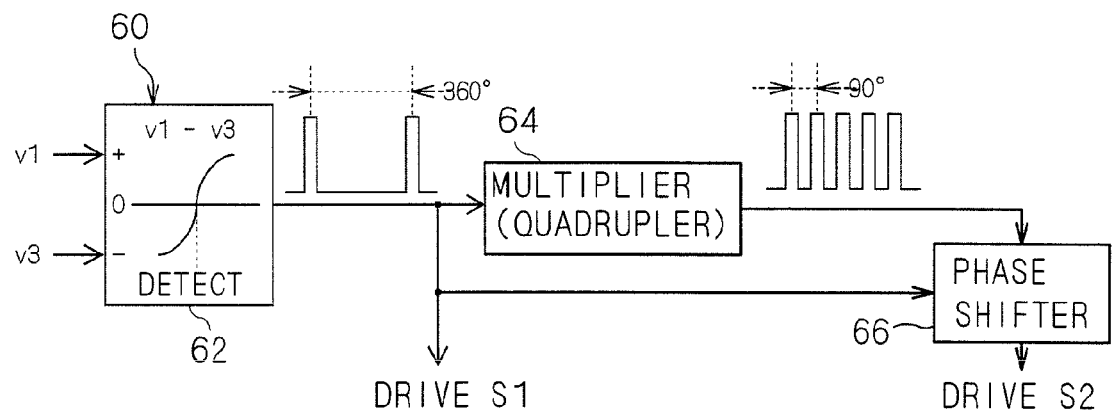
FIG. 2 is a conceptual diagram of a zero-crossing circuit.

FIG. 2 is a conceptual diagram of the zero-crossing circuit 60. Measured values of the first phase voltage v1 and the third phase voltage v3 are inputted to the zero-crossing circuit 60, and conduction/non-conduction states of the switches S1, S2 are controlled. Specifically, the first phase voltage v1 and the third phase voltage v3 are inputted, and a detection section 62 detects a time (a zero-crossing point) when a difference v1−v3 (hereinafter referred to as a fourth phase voltage Vinv1: the reason why it is referred to as the phase voltage will be described later) therebetween is shifted from negative to positive, and generates a pulse. Conduction of the switch S1 is permitted at or around the time of the generation of this pulse.

A frequency multiplier 64 multiplies the fourth phase voltage Vinv1 four times. Since one cycle in which the fourth phase voltage Vinv1 is shifted from negative to positive is equal to a phase angle of 360°, the multiplied signal becomes a pulse which is activated at every 90° phase angle.

By using the pulse generated by the frequency multiplier 64, a phase shifter 66 shifts the pulse outputted from the detection section 62, by 90°. Conduction of the switch S2 is permitted at or around the time of the generation of this pulse.

At timings of the permissions given by the two kinds of pulses from the zero-crossing circuit 60, the switches S1, S2 start conducting. Triggered by the start of the conduction, the three-phase/two-phase conversion inductor 14 performs phase conversion of the voltage. The three-phase/two-phase conversion inductor 14 inputs thereto the first phase voltage v1 and the third phase voltage v3, and outputs the aforementioned fourth phase voltage Vinv1 based on the third phase voltage v3. The three-phase/two-phase conversion inductor 14 also outputs a fifth phase voltage Vinv2 based on the second phase voltage v2. The fifth phase voltage Vinv2 cooperates with the fourth phase voltage Vinv1 to form two-phase voltages (therefore, the voltage Vinv1 is referred to as the (fourth) "phase voltage").

Specifically, for example, a coil 140 having both endpoints 142, 144 and a tap 146 provided at the center between the both endpoints 142, 144 is adopted as the three-phase/two-phase conversion inductor 14. The first phase voltage v1 and the third phase voltage v3 are applied to the endpoint 142 and the endpoint 144, respectively. A voltage outputted from the tap 146 serves as the fifth phase voltage Vinv2 based on the second phase voltage v2. This is because an inductance of a coil portion 140a formed between the endpoint 142 and the tap 146 is equal to an inductance of a coil portion 140b formed between the endpoint 144 and the tap 146, and therefore the potential of the tap 146 has a value intermediate between the potential of the endpoint 142 and the potential of the endpoint 144.

By using phase voltages synthesized and outputted at the tap 146, the fifth phase voltage Vinv2 based on the second phase voltage v2 is outputted. The phase of this fifth phase voltage Vinv2 has a phase difference of 90° relative to the phase of the fourth phase voltage Vinv1, and the fourth phase voltage Vinv1 and the fifth phase voltage Vinv2 form the two-phase voltages.

Figure 3:
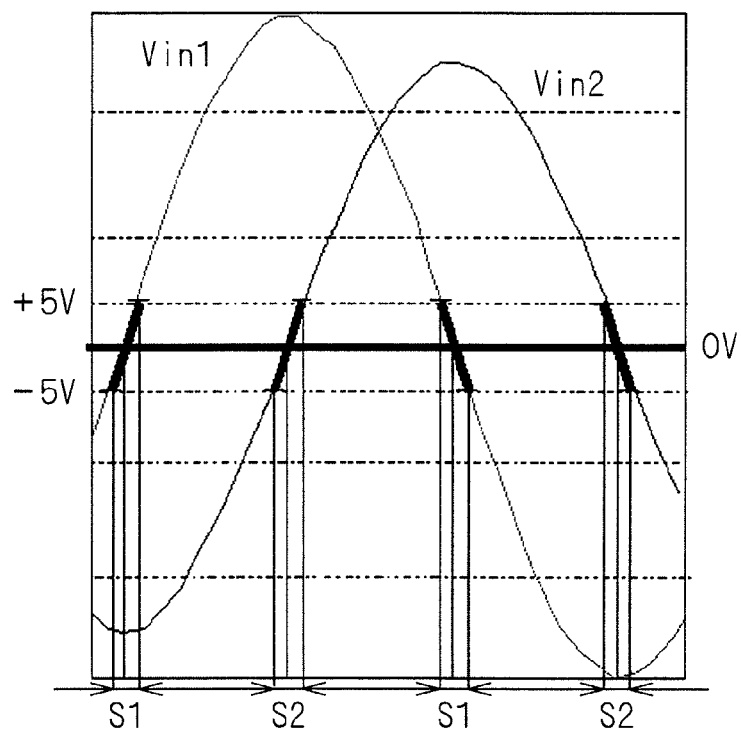
FIG. 3 is a graph illustrating voltage waveforms of two-phase voltages at a time of a start-up/recovery.

FIG. 3 is a graph illustrating voltage waveforms of the two-phase voltages at a time of a start-up/recovery. The above-described zero-crossing circuit 60 outputs the pulse indicating a zero-crossing of the fourth phase voltage Vinv1 and the pulse having a phase difference of 90° therefrom. The phase of the fourth phase voltage Vinv1 and the phase of the fifth phase voltage Vinv2 are different from each other by 90°. Therefore, when the fourth phase voltage Vinv1 and the fifth phase voltage Vinv2 shown in FIG. 3 have voltage values close to 0V, conduction of the switches S1, S2 are permitted, respectively.

The first single-phase pulse-width modulation converter 16 rectifies the fourth phase voltage Vinv1 to obtain a first rectified current id1, performs a pulse-width modulation thereon, and outputs a first modulated current m12. The second single-phase pulse-width modulation converter 18 rectifies the fifth phase voltage Vinv2 to obtain a second rectified current id2, performs a pulse-width modulation thereon, and outputs a second modulated current m34.

The rectifier circuit 10 synthesizes the first modulated current m12 and the second modulated current m34, and outputs an output current mi.

The output current mi is supplied to a circuit 90 in which a capacitor 20 and the load 92 are connected in parallel, and thereby the DC voltage Vdc maintained by the capacitor 20 is applied to the load 92.

The capacitor 20 is connected in parallel with each of the output side of the first single-phase pulse-width modulation converter 16 and the output side of the second single-phase pulse-width modulation converter 18, so that the capacitor 20 can easily control operations of the first single-phase pulse-width modulation converter 16 and the second single-phase pulse-width modulation converter 18.

A first AC current Iinv1 and a second AC current Iinv2 obtained through the zero-crossing circuit 60 and the three-phase/two-phase conversion inductor 14 described above have a phase difference of 90° from each other, and ripples of the first modulated current m12 and the second modulated current m34 cancel each other. Accordingly, ripples in the smoothed DC voltage Vdc including fundamental wave components of the first AC current Iinv1 and the second AC current Iinv2, respectively, can be reduced. Moreover, the first AC current Iinv1 and the second AC current Iinv2 can be made close to sine waves, and harmonic components thereof can be reduced.

The first single-phase pulse-width modulation converter 16 has a first single-phase diode bridge 22 and a first chopper 24. The first single-phase diode bridge 22 outputs the first rectified current id1 which is obtained by performing a full-wave rectification on the first AC current Iinv1. The first chopper 24 performs a first chopper operation on the first rectified current id1, to output the first modulated current m12.

The second single-phase pulse-width modulation converter 18 has a second single-phase diode bridge 32 and a second chopper 34. The second single-phase diode bridge 32 outputs the second rectified current id2 which is obtained by performing a full-wave rectification on the second AC current Iinv2. The second chopper 34 performs a second chopper operation on the second rectified current id2, to output the second modulated current m34.

The first single-phase diode bridge 22 has a high-potential side output end (marked with the sign "+" in the drawing) which outputs the first rectified current id1, and a low-potential side output end (marked with the sign "−" in the drawing). The first rectified current id1 has its positive side in a direction flowing out from the high-potential side output end. The second single-phase diode bridge 32 has a high-potential side output end (marked with the sign "+" in the drawing) which outputs the second rectified current id2, and a low-potential side output end (marked with the sign "−" in the drawing). The second rectified current id2 also has its positive side in a direction flowing out from the high-potential side output end.

The first chopper 24 includes input-side terminals 24a, 24c, output-side terminals 24b, 24d, a first inductor 42, a first switching element 44, a first diode 46, and a second diode 48. The input-side terminals 24a, 24c are connected to the high-potential side output end and the low-potential side output end of the first single-phase diode bridge 22, respectively. The output-side terminals 24b, 24d are connected to the high-potential side end and the low-potential side end of the capacitor 20, respectively.

The first inductor 42 is connected via the input-side terminal 24a to the high-potential side output end of the first single-phase diode bridge 22. The first switching element 44 has a first end connected to an anode of the first diode 46, and a second end connected to a cathode of the second diode 48. The first switching element 44 is opened and closed between these first end and second ends. In a specific example, the first switching element 44 is realized as an IGBT (Insulated Gate Bipolar Transistor) with a free-wheeling diode whose collector is connected to the anode of the first diode 46 and whose emitter is connected to the cathode of the second diode 48. As a material of the IGBT and the free-wheeling diode, not only silicon but also ones having a larger band-gap (such as silicon carbide, gallium arsenide, gallium nitride, and diamond) may be adopted.

The anode of the first diode 46 is connected to the first single-phase diode bridge 22 via the first inductor 42. A cathode of the first diode 46 is connected to the output-side terminal 24b, and the first modulated current (chopper current) m12 flows out therefrom.

The cathode of the second diode 48 and the emitter of the first switching element 44 are connected via the input-side terminal 24c to the low-potential side output end of the first single-phase diode bridge 22. An anode of the second diode 48 is connected to the output-side terminal 24d.

The second chopper 34 includes input-side terminals 34a, 34c, output-side terminals 34b, 34d, a second inductor 52, a second switching element 54, a third diode 56, and a fourth diode 58. The input-side terminals 34a, 34c are connected to the high-potential side output end and the low-potential side output end of the second single-phase diode bridge 32, respectively. The output-side terminals 34b, 34d are connected to the high-potential side end and the low-potential side end of the capacitor 20, respectively.

The second inductor 52 is connected via the input-side terminal 34a to the high-potential side output end of the second single-phase diode bridge 32. The second switching element 54 has a first end connected to an anode of the third diode 56, and a second end connected to a cathode of the fourth diode 58. The second switching element 54 is opened and closed between these first end and second ends. In a specific example, the second switching element 54 is realized as an IGBT with a free-wheeling diode whose collector is connected to the anode of the third diode 56 and whose emitter is connected to the cathode of the fourth diode 58.

The anode of the third diode 56 is connected to the second single-phase diode bridge 32 via the second inductor 52. A cathode of the third diode 56 is connected to the output-side terminal 34b, and the second modulated current (chopper current) m34 flows out therefrom.

The cathode of the fourth diode 58 and the emitter of the second switching element 54 are connected via the input-side terminal 34c to the low-potential side output end of the second single-phase diode bridge 32. An anode of the fourth diode 58 is connected to the output-side terminal 34d.

Accordingly, the cathode of the first diode 46 and the cathode of the third diode 56 are commonly connected to the high-potential side end of the capacitor 20, and the anode of the second diode 48 and the anode of the fourth diode 58 are commonly connected to the low-potential side end of the capacitor 20.

Since the first chopper 24 and the second chopper 34 are configured in the above-described manner, a step-up chopper can be performed as the first chopper operation and the second chopper operation. This enables the capacitor 20 to maintain a DC voltage Vdc higher than peak values of the fourth phase voltage Vinv1 and the fifth phase voltage Vinv2 inputted to the first single-phase diode bridge 22 and the second single-phase diode bridge 32, respectively.

In each of the first switching element 44 and the second switching element 54, based on each of switching signals SW1, SW2 supplied thereto, states of conduction/non-conduction between the collector and the emitter is controlled, and the first chopper operation and the second chopper operation are performed.

Since the above-described configuration may adopt an existing device, the configuration can be realized at a low cost.

<Signal Generation Circuit>

FIG. 4 is a circuit diagram illustrating a configuration of a switching signal generation circuit 9 which generates the switching signals SW1, SW2.

Values of the fourth phase voltage Vinv1, the fifth phase voltage Vinv2, the DC voltage Vdc, the first rectified current id1, and the second rectified current id2 are inputted to the switching signal generation circuit 9. As a method for obtaining these values, well-known current detection and voltage detection techniques are adoptable, and therefore a detailed description is omitted herein.

The fourth phase voltage Vinv1 and the fifth phase voltage Vinv2 are converted into absolute values in absolute value circuits 901, 902, respectively. This conversion corresponds to the full-wave rectification.

A voltage command generator 903 generates a voltage command value Vdc* corresponding to a desired DC voltage Vdc. Then, a subtractor 904 obtains a voltage deviation Ve which is a deviation of the DC voltage Vdc corresponding to the voltage command value Vdc*.

Since the capacitor 20 is connected in parallel with each of the output side of the first single-phase pulse-width modulation converter 16 and the output side of the second single-phase pulse-width modulation converter 18 as described above, the voltage command value Vdc* is sufficient as command values for outputs of both the first and second single-phase pulse-width modulation converters 16 and 18.

The voltage deviation Ve is once subjected to a PI control by a PI controller 905, then has its upper limit and lower limit set by a limiter 906, and additionally amplified K times by an amplifier 907.

In a multiplier 908, a result of the above-mentioned amplification is multiplied by the absolute value of the fourth phase voltage Vinv1, so that a current command value id1* is obtained. Here, the current command value id1* is a command value corresponding to the first rectified current id1.

Then, a subtractor 910 obtains a current deviation ie1 which is a deviation of the first rectified current id1 from the current command value id1*.

The current deviation ie1 is once subjected to a PI control by a PI controller 912, and then its upper limit and lower limit are set by a limiter 914. Thus, the current deviation ie1 becomes a PWM-modulated signal wave i1 which will be described later.

In a multiplier 909, a result of the amplification in the amplifier 907 is multiplied by the absolute value of the fifth phase voltage Vinv2, so that a current command value id2* is obtained. Here, the current command value id2* is a command value corresponding to the second rectified current id2.

Then, a subtractor 911 obtains a current deviation ie2 which is a deviation of the second rectified current id2 from the current command value id2*.

The current deviation ie2 is once subjected to a PI control by a PI controller 913, and then its upper limit and lower limit are set by a limiter 915. Thus, the current deviation ie2 becomes a PWM-modulated signal wave i2 which will be described later.

Carrier wave generation sections 916, 917 generate carrier waves C1, C2 with predetermined offsets. The carrier waves C1, C2 are carrier waves used for a PWM modulation. The carrier waves C1, C2 have opposite phases (a phase difference is 180°). In FIG. 4, a relationship of these opposite phases is indicated by the difference between the positions of the marks ○ put to the carrier wave generation sections 916, 917.

A differential amplifier 918 inputs thereto the signal wave i1 and the carrier wave C1, and outputs the switching signal SW1 which is activated when the former exceeds the latter. A differential amplifier 919 inputs thereto the signal wave i2 and the carrier wave C2, and outputs the switching signal SW2 which is activated when the former exceeds the latter.

The switching signals SW1, SW2 are generated in the above-described manner. Therefore, since the first and second switching elements 44, 54 are operated based on the switching signals SW1, SW2, the first and second rectified currents id1, id2 flows such that a DC voltage Vdc equivalent to the voltage command value Vdc* can be maintained by the capacitor 20.

<Result of Simulation>

In the following, a description will be given of a result of simulation of the operation of the rectifier circuit 10 having the above-described configuration.

Figure 5:
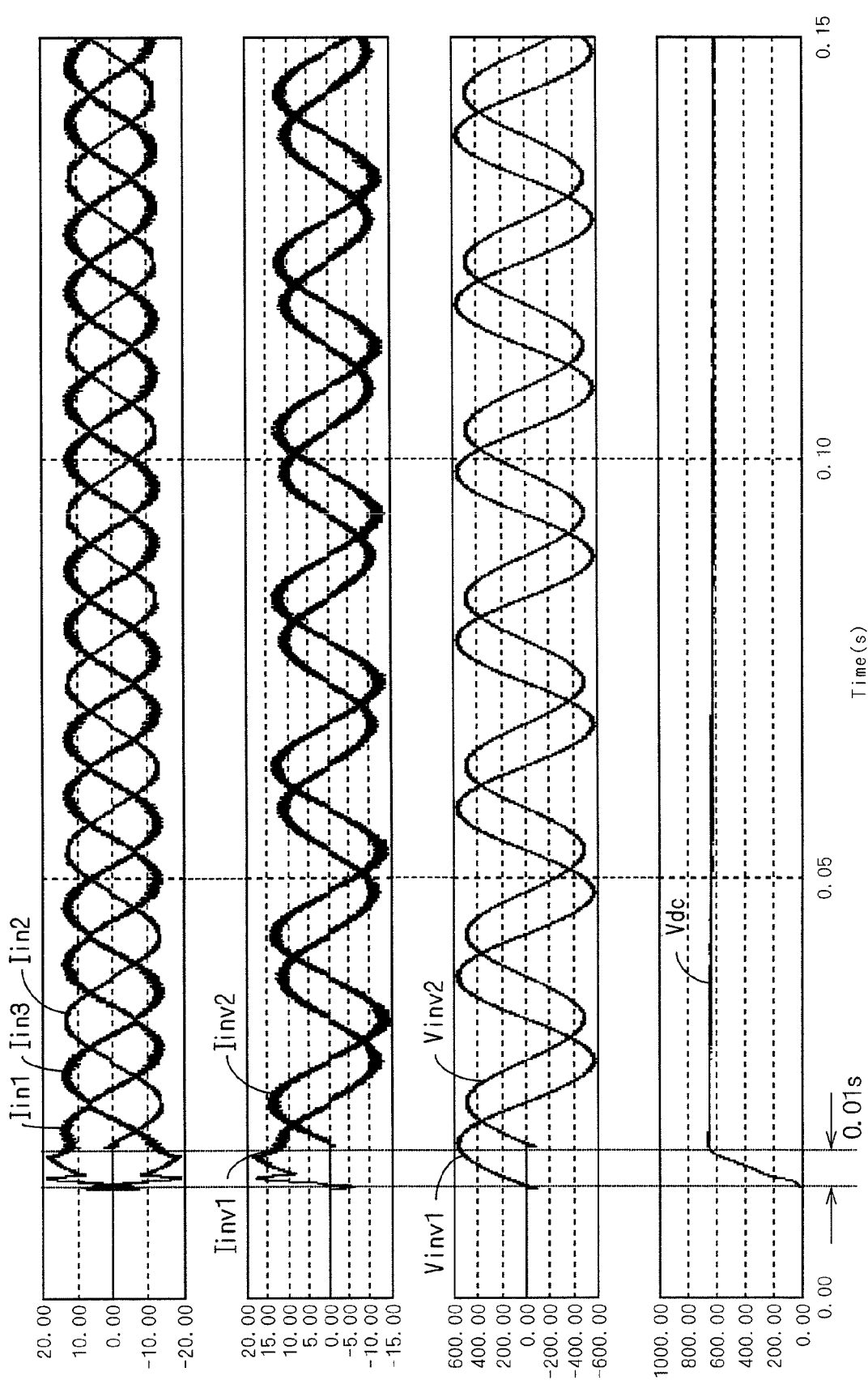
FIG. 5 is a diagram showing input/output waveforms obtained as a result of simulation at a time of a start-up according to a first embodiment.

FIG. 5 is a diagram showing input/output waveforms obtained as a result of simulation at a time of a start-up according to the first embodiment. The uppermost graph shows waveforms of line currents Iin1 to Iin3 obtained from the three-phase voltage source 12. The second uppermost graph shows waveforms of the first AC current Iinv1 and the second AC current Iinv2. The second lowermost graph shows waveforms of the fourth phase voltage Vinv1 and the fifth phase voltage Vinv2. The lowermost graph shows a voltage value of the DC voltage Vdc maintained by the capacitor 20. In each of the graphs, a base (time zero) of the time axis (horizontal axis) is a time traced back from the start-up by a predetermined time period.

As shown in FIG. 5, when and after 0.01 seconds elapse after the start-up, the waveforms of all the line currents Iin1 to Iin3 become sine waves and substantially stabilized.

Also, in the first AC current Iinv1 and the second AC current Iinv2, a high current does not occur unlike in the conventional technique. When and after 0.01 seconds elapse after the start-up, the waveforms of both currents become sine waves and substantially stabilized.

Moreover, in the fourth phase voltage Vinv1 and the fifth phase voltage Vinv2, a high voltage does not occur unlike in the conventional technique. Immediately after the start-up, the waveforms of both voltages become sine waves and substantially stabilized.

Furthermore, in the DC voltage Vdc, a high voltage does not occur unlike in the conventional technique. When and after 0.01 seconds elapse after the start-up, the DC voltage Vdc is stabilized at a certain voltage (for example, approximately 600V).

Figure 6:
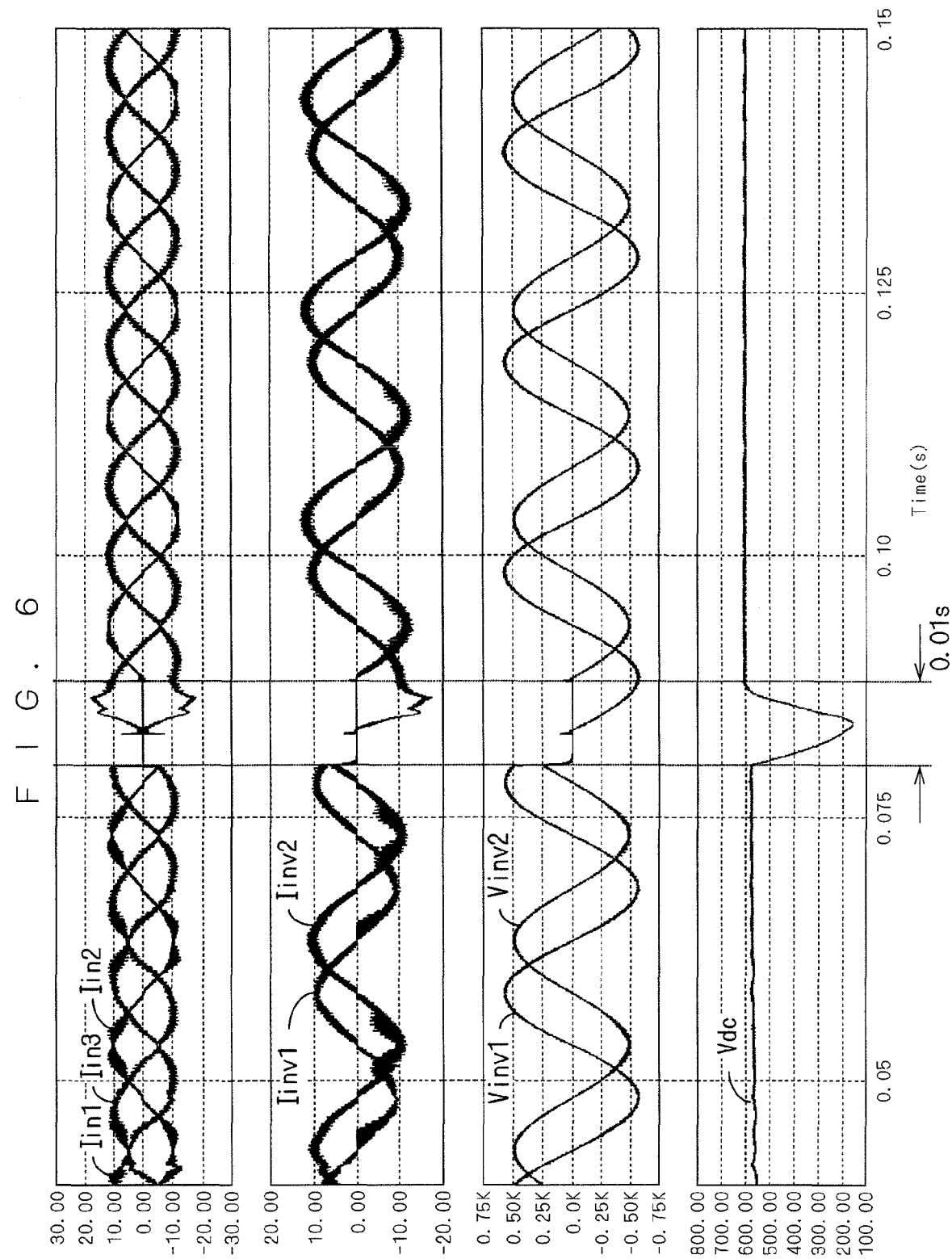
FIG. 6 is a diagram showing input/output waveforms obtained as a result of simulation at a time of a recovery according to the first embodiment.

FIG. 6 is a diagram showing input/output waveforms obtained as a result of simulation at a time of a recovery according to the present invention. FIG. 6 shows a result of simulation in which an instantaneous stop occurs. Similarly to FIG. 5, the uppermost graph shows waveforms of the line currents Iin1 to Iin3. The second uppermost graph shows waveforms of the first AC current Iinv1 and the second AC current Iinv2. The second lowermost graph shows waveforms of the fourth phase voltage Vinv1 and the fifth phase voltage Vinv2. The lowermost graph shows a voltage value of the DC voltage Vdc.

In each of the graphs, a base of the time axis is an arbitrary time in a normal operation state. A case where an instantaneous stop occurs at a time between 0.08 seconds and 0.083 seconds after the base time, is shown.

As shown in FIG. 6, when and after 0.01 seconds elapse after the instantaneous stop, the waveforms of all the line currents Iin1 to Iin3 become sine waves and substantially stabilized. Also, in a period until 0.01 seconds elapse after the instantaneous stop, an occurrence of a high current, which is caused in the above-described conventional technique, is suppressed.

Also, in the first AC current Iinv1 and the second AC current Iinv2, a high current does not occur unlike in the conventional technique. When and after 0.01 seconds elapse after the instantaneous stop, the waveforms of both currents become sine waves and substantially stabilized.

Moreover, in the fourth phase voltage Vinv1 and the fifth phase voltage Vinv2, a high voltage does not occur unlike in the conventional technique. Immediately after the instantaneous stop, the waveforms of both voltages become sine waves and substantially stabilized.

Furthermore, in the DC voltage Vdc, a high voltage does not occur unlike in the conventional technique. When and after 0.01 seconds elapse after the instantaneous stop, the DC voltage Vdc is stabilized at a certain voltage (for example, approximately 600V).

Figure 7:
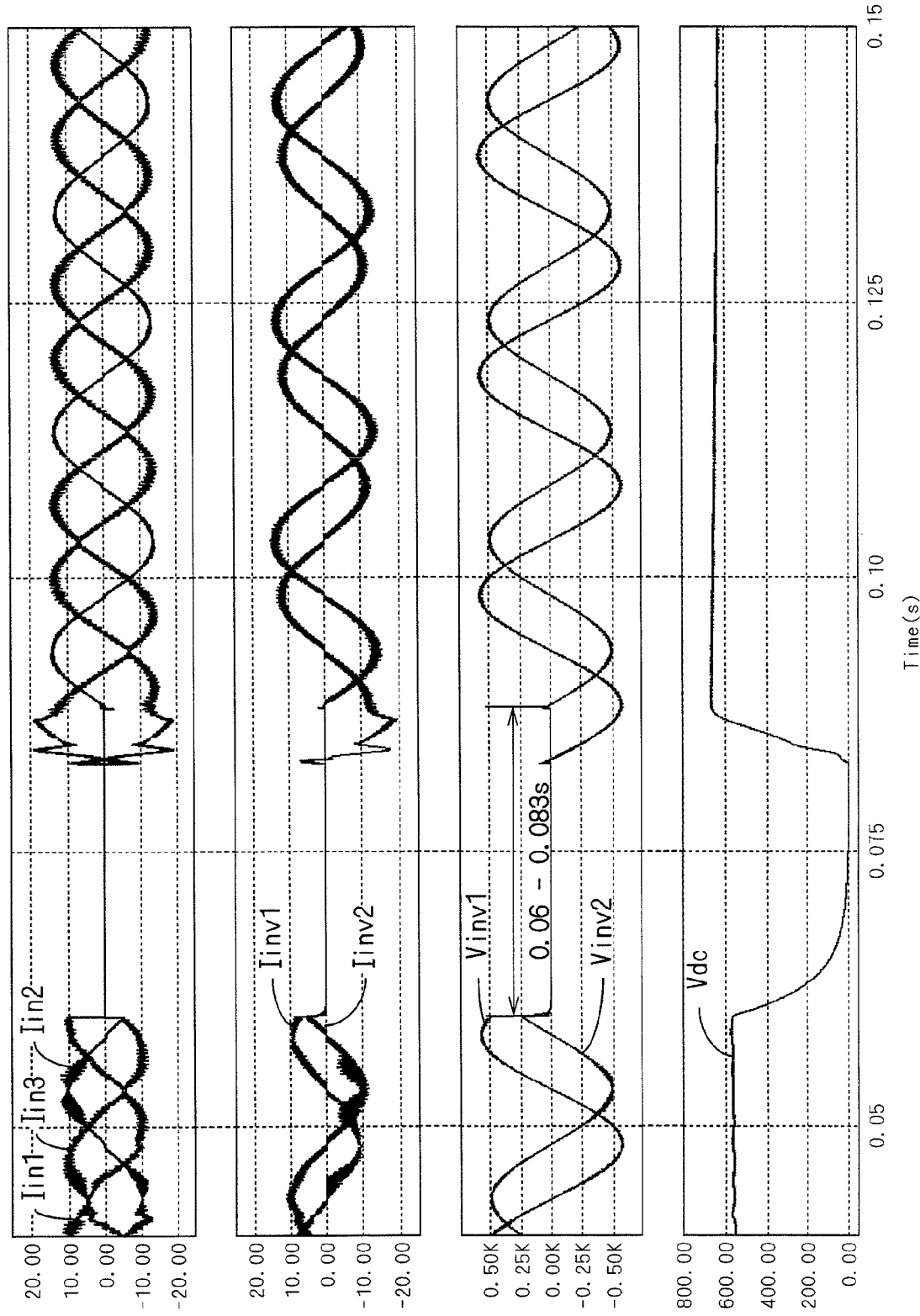
FIG. 7 is a diagram showing input/output waveforms obtained as a result of simulation at a time of a restart according to the first embodiment.

FIG. 7 is a diagram showing input/output waveforms obtained as a result of simulation at a time of a restart according to the present invention. FIG. 7 shows a state where an instantaneous stop occurs to make DC voltage Vdc=0V, and then start-up is performed. Here, the term "restart" indicates that a voltage is not applied from the three-phase voltage source 12 for a longer time period than a time period required for recovery due to power outage including an instantaneous stop, and the voltage of the three-phase voltage source 12 is applied after the voltage Vdc becomes 0V. Similarly to FIGS. 5 and 6, the uppermost graph shows waveforms of the line currents Iin1 to Iin3. The second uppermost graph shows waveforms of the first AC current Iinv1 and the second AC current Iinv2. The second lowermost graph shows waveforms of the fourth phase voltage Vinv1 and the fifth phase voltage Vinv2. The lowermost graph shows a voltage value of the DC voltage Vdc.

In each of the graphs, a base of the time axis is an arbitrary time in a normal operation state. A case where a power supply is stopped at a time between 0.06 seconds and 0.83 seconds after the base time, and a restart is performed when 0.83 seconds elapse after the base time, is shown.

As shown in FIG. 7, when and after 0.01 seconds elapse after the restart, the waveforms of all the line currents Iin1 to Iin3 become sine waves and substantially stabilized. Also, in a period until 0.01 seconds elapse after the restart, an occurrence of a high current, which is caused in the above-described conventional technique, is suppressed.

Also, in the first AC current Iinv1 and the second AC current Iinv2, a high current does not occur unlike in the conventional technique. When and after 0.01 seconds elapse after the restart, the waveforms of both currents become sine waves and substantially stabilized.

Moreover, in the fourth phase voltage Vinv1 and the fifth phase voltage Vinv2, a high voltage does not occur unlike in the conventional technique. Immediately after the restart, the waveforms of both voltages become sine waves and substantially stabilized.

Furthermore, in the DC voltage Vdc, a high voltage does not occur unlike in the conventional technique. When and after 0.01 seconds elapse after the restart, the DC voltage Vdc is stabilized at a certain voltage (for example, approximately 600V).

From the above, it is desirable that the configuration in which the fourth phase voltage Vinv1 and the fifth phase voltage Vinv2 have a phase difference of 90° is adopted, and moreover zero-crossing time points of the fourth phase voltage Vinv1 and the fifth phase voltage Vinv2 are adopted as time points for starting conduction of the switches S1, S2, respectively.

However, it is not always necessary that the zero-crossing time points of the fourth phase voltage Vinv1 and the fifth phase voltage Vinv2 are adopted as the time points for starting conduction of the switches S1, S2, respectively. Without such a limitation, the effect can be exerted as compared with the conventional technique, as described later.

Second Embodiment

Circuit Configuration

In this embodiment, the same circuit configuration as in the first embodiment is adopted. A description will be given, with reference to the drawings, of a case where switching is performed at times for starting conduction of the switches 51, S2 irrespective of the zero-crossing time points of the fourth phase voltage Vinv1 and the fifth phase voltage Vinv2.

<Result of Simulation>

Figure 8:
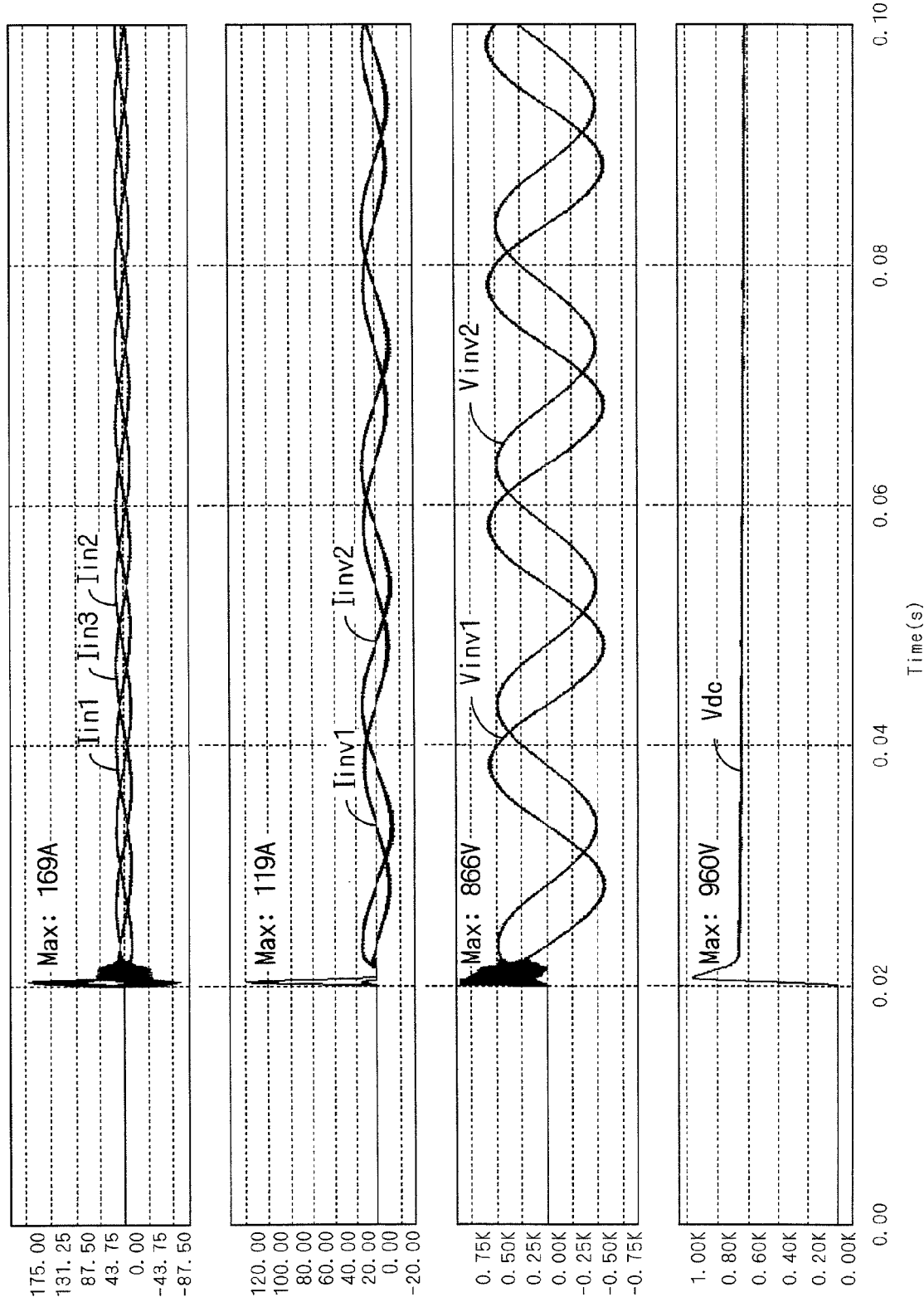
FIG. 8 is a diagram showing input/output waveforms obtained as a result of simulation at a time of a start-up according to a second embodiment.
Figure 9:
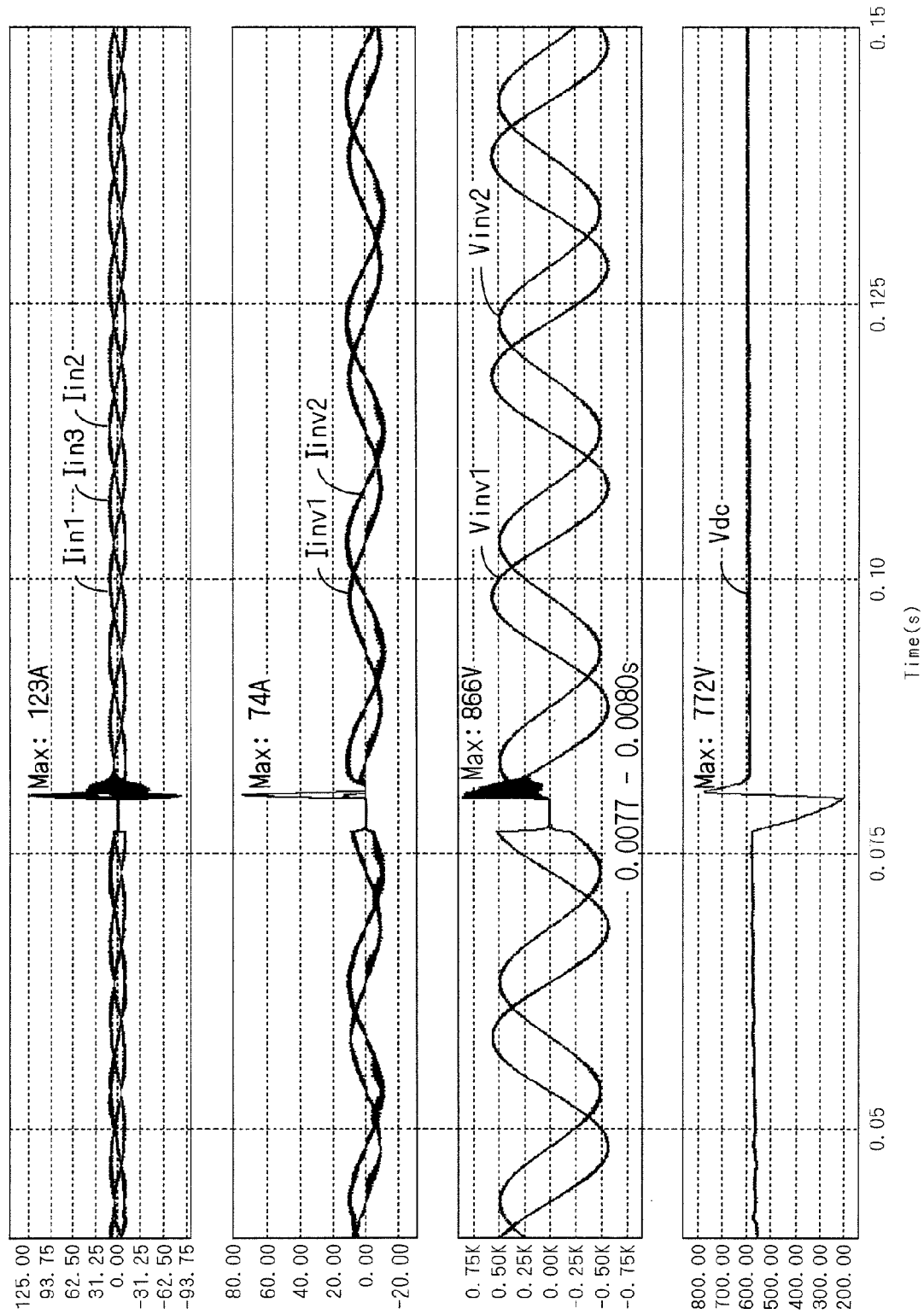
FIG. 9 is a diagram showing input/output waveforms obtained as a result of simulation at a time of a recovery according to the second embodiment.
Figure 10:
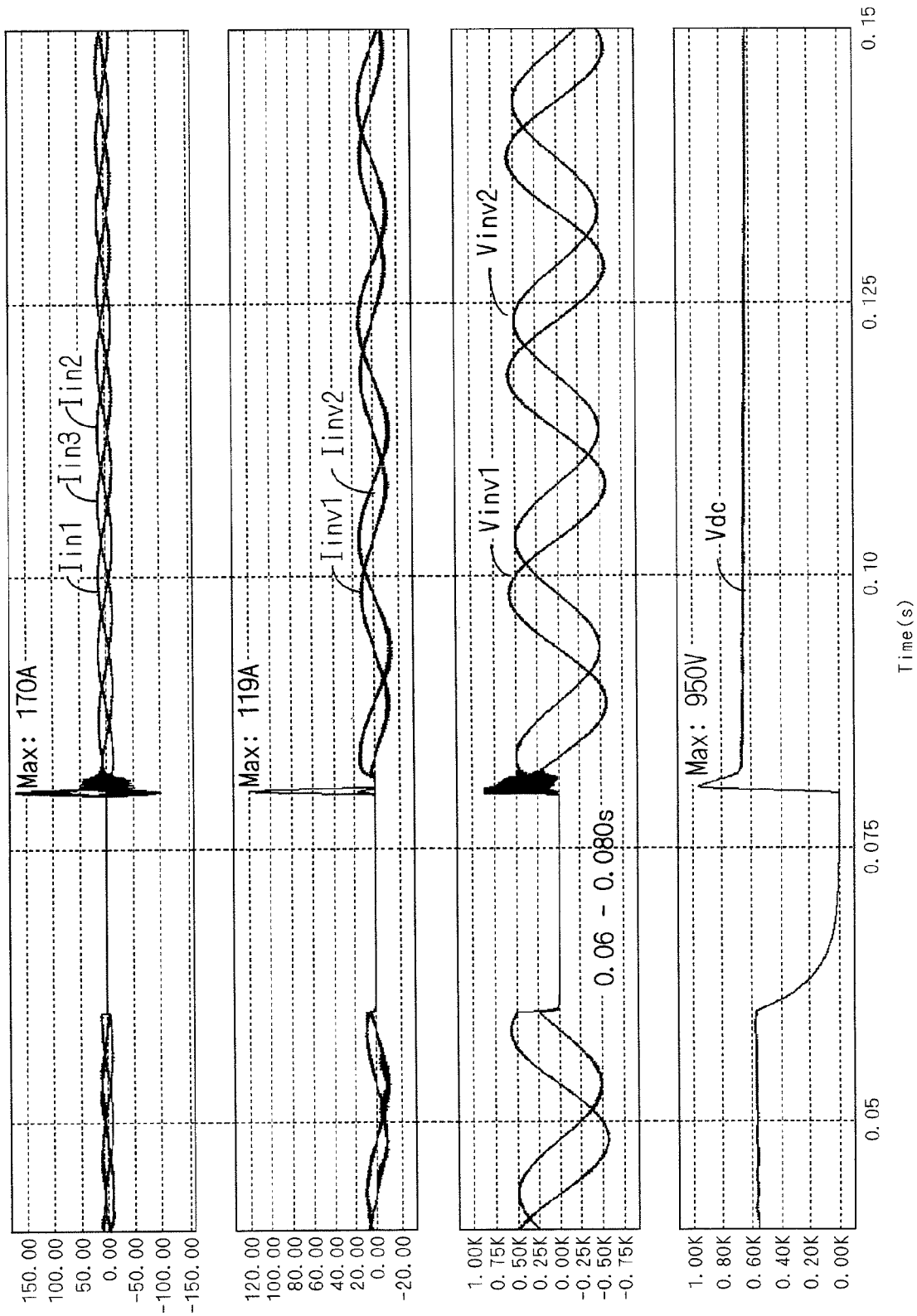
FIG. 10 is a diagram showing input/output waveforms obtained as a result of simulation at a time of a restart according to the second embodiment.
Figure 11:
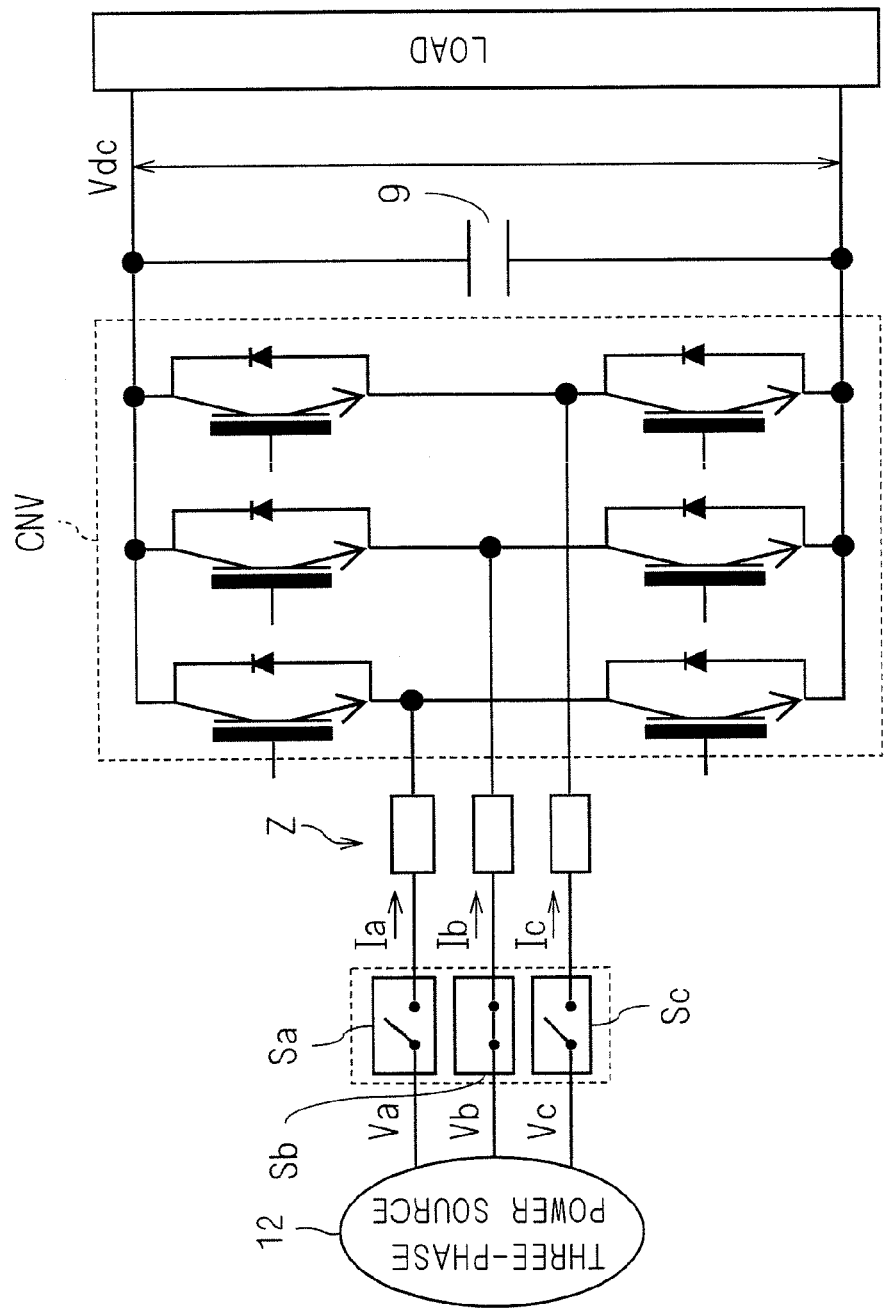
FIG. 11 is a circuit diagram illustrating a conventional three-phase PWM converter.
Figure 12:
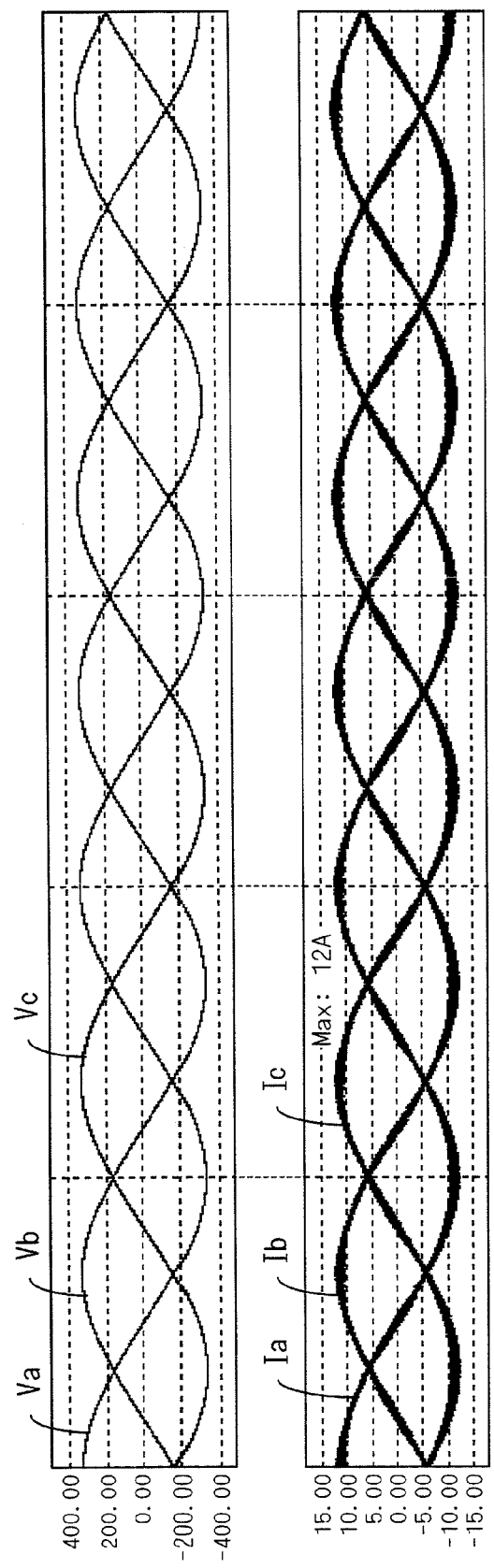
FIG. 12 is a diagram showing input/output waveforms obtained as a result of simulation in a steady state of the conventional three-phase PWM converter.
Figure 13:
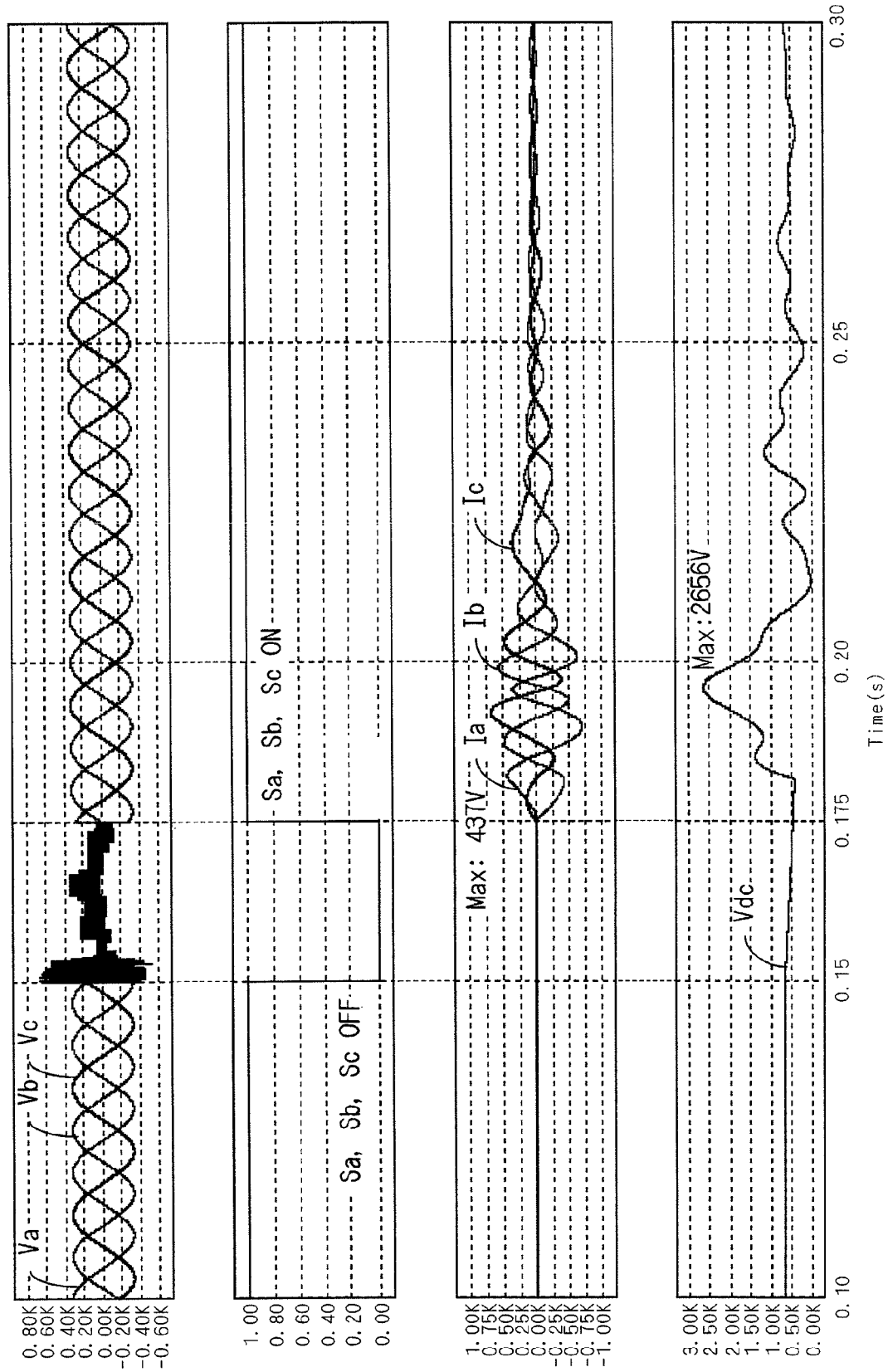
FIG. 13 is a diagram showing input/output waveforms obtained as a result of simulation at a time of an instantaneous-stop/recovery in the conventional three-phase PWM converter.
Figure 14:
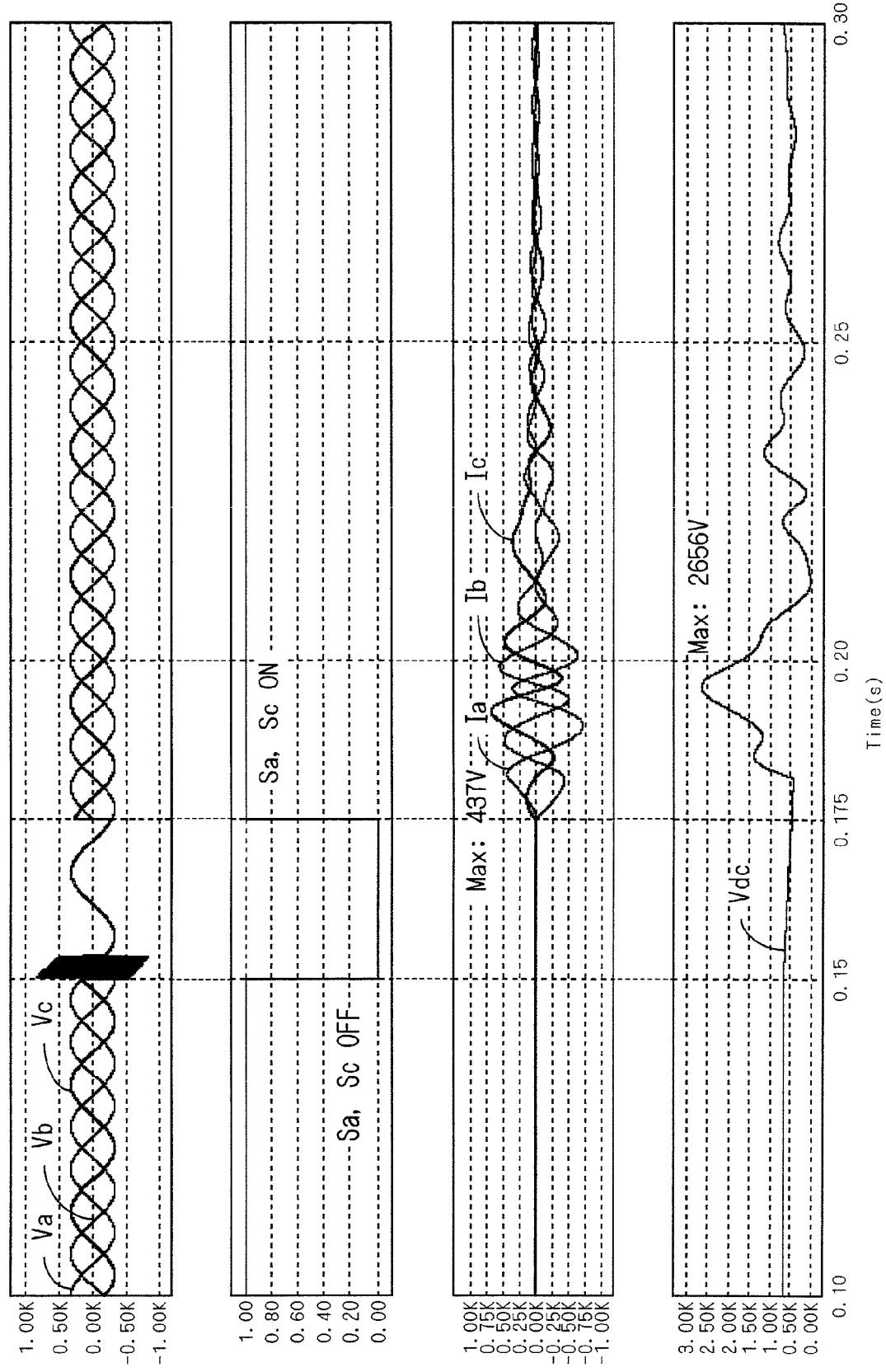
FIG. 14 is a diagram showing input/output waveforms obtained as a result of simulation at a time of an instantaneous-stop/recovery in the conventional three-phase PWM converter.

Each of FIGS. 8 to 10 is a diagram showing input/output waveforms obtained as a result of simulation according to the second embodiment. The uppermost graph shows waveforms of the line currents Iin1 to Iin3 supplied from the three-phase voltage source 12. The second uppermost graph shows waveforms of the first AC current Iinv1 and the second AC current Iinv2. The second lowermost graph shows waveforms of the fourth phase voltage Vinv1 and the fifth phase voltage Vinv2. The lowermost graph shows a voltage value of the DC voltage Vdc maintained by the capacitor 20.

FIG. 8 shows a case of a start-up, FIG. 9 shows a case of a recovery, and FIG. 10 shows a case of a restart. In each of the graphs, a base (time zero) of the time axis (horizontal axis) is a time traced back from the start-up, the recovery, or the restart, by a predetermined time period. FIG. 9 shows a case where an instantaneous stop occurs at a time between 0.0077 seconds to 0.0080 seconds after the base time. FIG. 10 shows a case where a power supply is stopped at a time between 0.06 seconds and 0.08 seconds after the base time, and the restart is performed when 0.08 seconds elapse after the base time.

Even in a case where the start-up, the recovery, and the restart are performed without controlling a switching as shown in FIGS. 8 to 10, an occurrence of a high voltage in the DC voltage Vdc can be suppressed because of the above-described configuration. It is also found that a variation in the current is reduced as compared with the conventional.

While the invention has been described in detail, the foregoing description is in all aspects illustrative and not restrictive. It is therefore understood that numerous modifications and variations can be devised without departing from the scope of the invention.

The invention claimed is:

1. A rectifier circuit comprising:
    a first switch having one end to which a first phase voltage outputted from a three-phase voltage source is applied, and the other end whose conduction/non-conduction with said one end is controlled;
    a second switch having one end to which a second phase voltage outputted from said three-phase voltage source is applied, and the other end whose conduction/non-conduction with said one end is controlled;
    a three-phase/two-phase conversion inductor that inputs thereto said second phase voltage from said other end of said second switch, said first phase voltage from said other end of said first switch, and a third phase voltage outputted from said three-phase voltage source, and outputs a fourth phase voltage and a fifth phase voltage, said fourth phase voltage being said first phase voltage based on said third phase voltage, said fifth phase voltage being based on said second phase voltage and cooperating with said fourth phase voltage to form two-phase voltages;
    a first single-phase pulse-width modulation converter that performs a first pulse-width modulation on a first rectified current obtained by rectifying said fourth phase voltage, and outputs a first modulated current; and
    a second single-phase pulse-width modulation converter that performs a second pulse-width modulation on a second rectified current obtained by rectifying said fifth phase voltage, and outputs a second modulated current.

2. The rectifier circuit according to claim 1, wherein
said first switch is shifted from a non-conduction state to a conduction state, when a voltage obtained by subtracting said third phase voltage from said first phase voltage is substantially zero,
said second switch is shifted from a non-conduction state to a conduction state, nearly when said voltage has an extreme value.

3. The rectifier circuit according to claim 1, wherein
said first switch is shifted from a non-conduction state to a conduction state, while said second switch is not conducting,
said second switch is shifted from a non-conduction state to a conduction state, while said first switch is conducting.

4. The rectifier circuit according to claim 1, further comprising a capacitor connected in parallel with each of an output side of said first single-phase pulse-width modulation converter and an output side of said second single-phase pulse-width modulation converter.

5. The rectifier circuit according to claim 4, wherein
said first single-phase pulse-width modulation converter includes:
    a first single-phase diode bridge that performs a full-wave rectification on said fourth phase voltage, and outputs said first rectified current; and
    a first chopper that performs is a first chopper operation on said first rectified current, and outputs said first modulated current,
said second single-phase pulse-width modulation converter includes:
    a second single-phase diode bridge that performs a full-wave rectification on said fifth phase voltage, and outputs said second rectified current; and
    a second chopper that performs a second chopper operation on said second rectified current, and outputs said second modulated current.

6. The rectifier circuit according to claim 5, wherein
said first single-phase diode bridge includes:
    a high-potential side output end that outputs said first rectified current; and
    a low-potential side output end,
said first chopper includes:
    a first inductor connected to said high-potential side output end of said first single-phase diode bridge;
    a first diode having an anode connected to said first single-phase diode bridge via said first inductor, and a cathode that outputs said first modulated current;
    a second diode having an anode and a cathode connected to said low-potential side output end of said first single-phase diode bridge; and
    a first switching element having a first end connected to said anode of said first diode and a second end connected to said cathode of said second diode, said first switching element being opened and closed between said first end and said second end,
said second single-phase diode bridge includes:
    a high-potential side output end that outputs said second rectified current; and
    a low-potential side output end,
said second chopper includes:
    a second inductor connected to said high-potential side output end of said second single-phase diode bridge;
    a third diode having an anode connected to said second single-phase diode bridge via said second inductor, and a cathode that outputs said second modulated current;
    a fourth diode having an anode and a cathode connected to said low-potential side output end of said second single-phase diode bridge; and
    a second switching element having a third end connected to said anode of said third diode and a fourth end connected to said cathode of said fourth diode, said second switching element being opened and closed between said third end and said fourth end,
said cathode of said first diode and said cathode of said third diode are commonly connected to one end of said capacitor,
said anode of said second diode and said anode of said fourth diode are commonly connected to the other end of said capacitor.

\* \* \* \* \*